United States Patent
Hoffman et al.

(10) Patent No.: US 10,926,705 B2
(45) Date of Patent: Feb. 23, 2021

(54) VEHICLE FRONT TRUNK ACCESS

(71) Applicant: FORD GLOBAL TECHNOLGIES, LLC, Dearborn, MI (US)

(72) Inventors: Colleen Marie Hoffman, Canton, MI (US); Dennis P. Laakso, Howell, MI (US); Dragan B. Stojkovic, Taylor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 106 days.

(21) Appl. No.: 16/172,232

(22) Filed: Oct. 26, 2018

(65) Prior Publication Data

US 2020/0130586 A1    Apr. 30, 2020

(51) Int. Cl.
*B60R 5/02* (2006.01)
*B62D 25/10* (2006.01)

(52) U.S. Cl.
CPC .............. *B60R 5/02* (2013.01); *B62D 25/105* (2013.01)

(58) Field of Classification Search
CPC ................................ B60R 5/02; B62D 25/105
See application file for complete search history.

(56) References Cited

U.S. PATENT DOCUMENTS

| 9,527,450 B1 | 12/2016 | Bellis et al. |
| 9,956,860 B2 | 5/2018 | Tsuji |
| 2009/0101422 A1 | 4/2009 | Subramanian |

FOREIGN PATENT DOCUMENTS

| DE | 3518899 A1 * | 11/1986 | ............. B60R 19/52 |
| EP | 0908373 A1 | 4/1994 | |
| GB | 2464370 B | 9/2010 | |
| JP | 2004217025 A | 8/2004 | |

OTHER PUBLICATIONS https:www.caricos.com/cars/l/lamborghini/2014_lamborghini_aventador_lp_700-4_roadster/images/13.html.

* cited by examiner

*Primary Examiner* — D Glenn Dayoan
*Assistant Examiner* — Melissa Ann Bonifazi
(74) *Attorney, Agent, or Firm* — David Coppiellie; MacMillan, Sobanski & Todd, LLC

(57) ABSTRACT

A vehicle having front body structure including a grille opening adjacent to a front trunk. A hood is pivotally mounted to the structure over the front trunk. A grille is mounted to the body structure or the hood via a horizontal hinge, the grille pivotable from a closed position in the grille opening to an open position extending from the body structure.

15 Claims, 3 Drawing Sheets

VEHICLE FRONT TRUNK ACCESS

BACKGROUND OF THE INVENTION

The present invention relates to a vehicle having a front trunk and more particularly to user access to the trunk.

Some vehicles include a front trunk, which may be due to the engine being located other than under a hood at the front of the vehicle, or due to the vehicle operating as a battery electric, in which case there is no engine under the hood.

In particular vehicle models, there may be customer options for an engine-based powertrain (gasoline, diesel, etc.), a hybrid electric powertrain or a pure battery electric powertrain. Due to cost efficiency, esthetics and functionality, the overall shape of the vehicle front end and structure may be maintained for all of the various powertrain options. For such vehicles, a hood and engine compartment is needed to receive and support the engine for the engine driven configuration of the vehicle. However, for the battery electric powertrain, then, the area where the engine is typically located may act as a front trunk for storage since no engine is present. Ease of access to this front trunk area is desirable.

SUMMARY OF THE INVENTION

An embodiment contemplates a vehicle having a front body structure including a grille opening adjacent to a front trunk, a hood pivotally mounted to the structure over the front trunk, and a grille mounted to the body structure via a horizontal hinge, the grille pivotable from a closed position in the grille opening to an open position extending forward from the body structure.

An embodiment contemplates a vehicle having a front body structure including a grille opening adjacent to a front trunk; a hood, pivotally mounted to the structure over the front trunk, and including a horizontal hinge extending laterally to create a front portion and a rear portion; and a grille, secured to the hood, pivotable with the front portion from a closed position in the grille opening to an open position out of the grille opening.

An embodiment contemplates a vehicle having front body structure including a grille opening adjacent to a front trunk; a hood pivotally mounted to the structure over the front trunk; and a grille mounted to the hood via a horizontal hinge, the grille pivotable from a closed position in the grille opening to an open position extending forward from the body structure.

An advantage of an embodiment is that essentially the same vehicle structure and front end look may be employed for various drivetrain configurations of a vehicle, while providing ease of access to a front trunk for a battery electric powertrain configuration of the vehicle.

DETAILED DESCRIPTION

Figure 1:
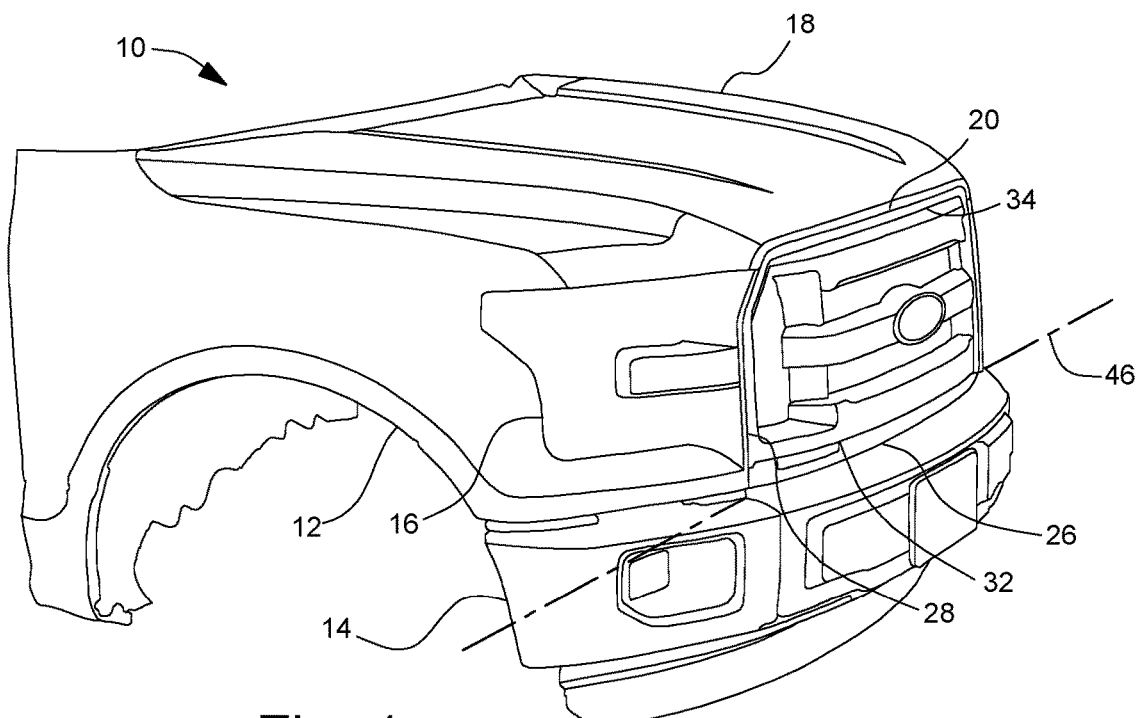
FIG. 1 is a schematic perspective view of a front end of a vehicle having a pivoting grille for front trunk access, with the grille shown in a closed position.
Figure 2:
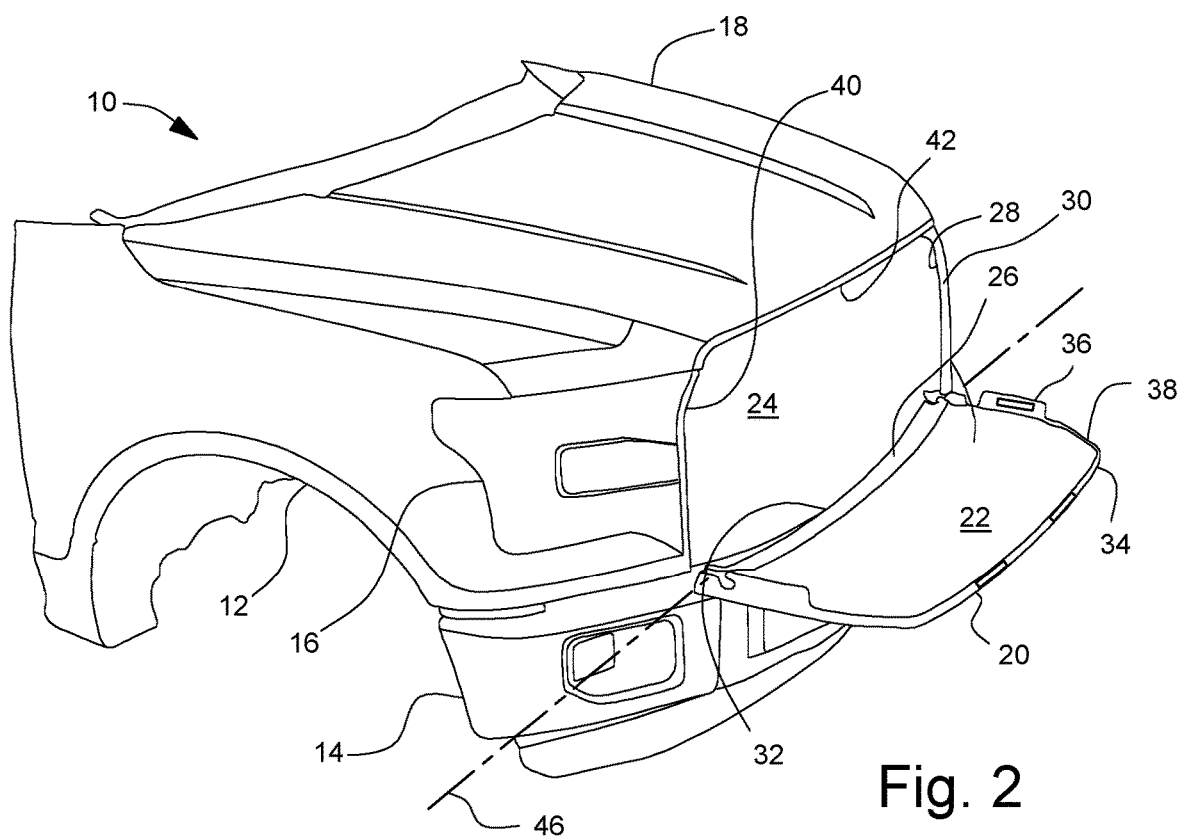
FIG. 2 is a schematic perspective view of the vehicle front end, with the grille shown in an open position.

FIGS. 1 and 2 illustrate a vehicle 10 having front fenders 12, a front bumper 14, headlights 16, a hood 18 and a grille 20. The vehicle 10 may be a pickup truck, although it may be a different type of vehicle if so desired. The hood 18 may be configured conventionally, if so desired, and pivot about conventional rear hinges (not shown).

The grille 20 may be sized and shaped to match a grille in an engine driven model of this vehicle in order to maintain the same look and allow for essentially the same front end vehicle body structure for both models. While the grille 20 may be configured to look the same as other models from outside of the vehicle 10, it may have a solid inner surface 22 in order to keep water out of a front trunk 24. The solid inner surface 22 may be feasible in this battery electric vehicle 10, rather than having perforations, since no air flow is needed for engine cooling.

The grille 20 includes a horizontal hinge 26 that extends laterally between sides 28 of a grille opening 30. When discussing a "horizontal" hinge herein, this means a hinge having a pivot axis 46 that extends generally horizontally. The hinge 26 may be a piano hinge or other type of hinge, if so desired. This hinge 26 may extend laterally just above the bumper 14 and allows the grille 20 to pivot about a bottom edge 32. Thus, in the open position (shown in FIG. 2) the grille 20 extends horizontally, forward of the vehicle, with a top edge 34 away from the vehicle 10.

Releasable latches 36 may mount to the sides 38 of the grille 20 and selectively engage body structure 40 along the sides of the grille opening 30. Alternatively, one or more releasable latches may extend from the top edge 34 and engage body structure 40 along the top 42 of the grille opening or the underside of the hood 18.

Access to the front trunk 24, then, may be convenient through either the grille 20, the hood 18 or both. That is, one may release the latches 36 and pivot the grille 20 downward about the horizontal hinge 26 to provide one access to slide items into and out of the front trunk 24 through the grille opening 30. The open grille 20 may act as a table or step to ease the ingress/egress of items from the front trunk 24. Additionally, one may open the hood 18 and insert/remove items from the front trunk 24 through the hood opening 44. Or, both the hood 18 and grille 20 may be open at the same time, providing a great amount of access to the front trunk 24.

Figure 3:
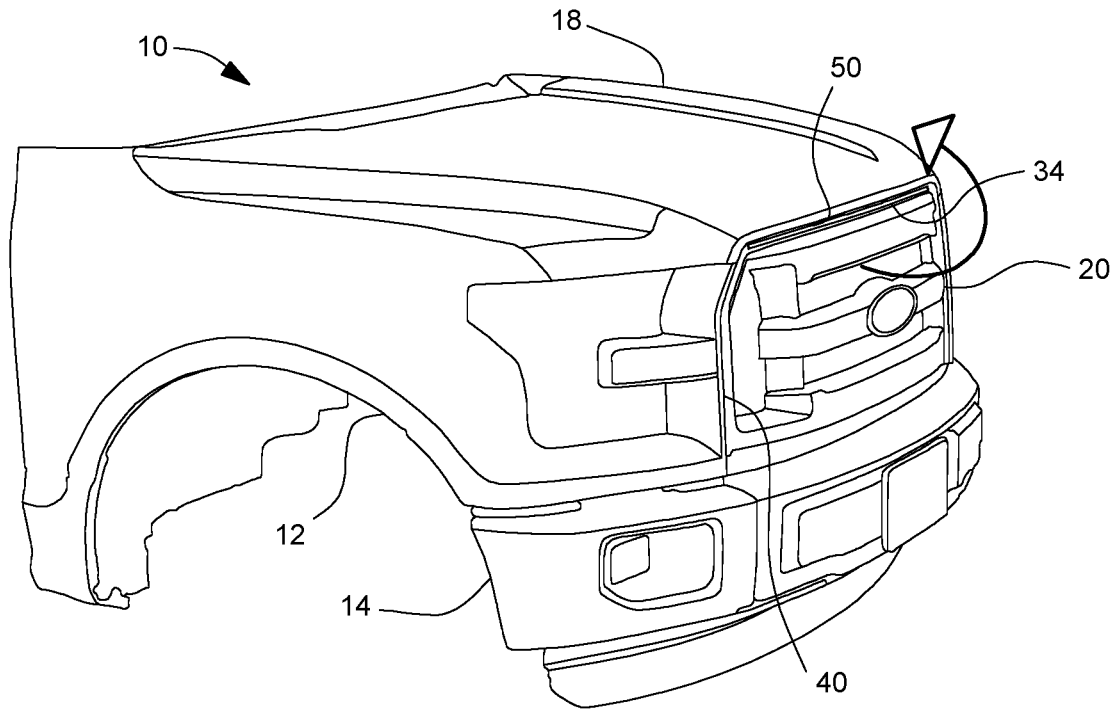
FIG. 3 is a schematic perspective view of a vehicle front end according to a second embodiment.

FIG. 3 illustrates an alternate embodiment, wherein similar elements to the first embodiment are given the same element numbers and the discussion herein will not be repeated.

In this embodiment, a horizontal hinge 50 is mounted along a top edge 34 of the grille 20 and mounted to vehicle body structure 40 or the hood 18. If mounted to the body structure 40, then the hood 18 and grille 20 may be pivoted open separately for access to the front trunk. If mounted to the hood 18, then the grille 20 is pivoted open relative to the hood 18 for front access to the front trunk, or the grille 20 may be pivoted open and then the hood 18 pivoted open to provide a large opening for one to access the front trunk.

Figure 4:
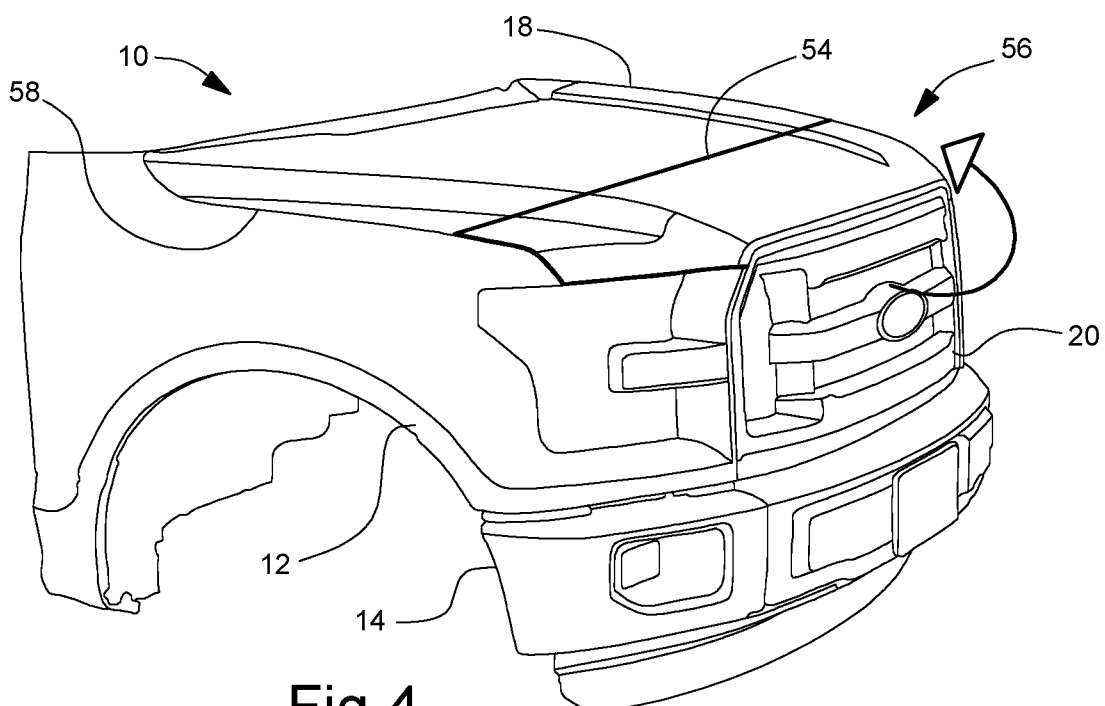
FIG. 4 is a schematic perspective view of a vehicle front end according to a third embodiment.

FIG. 4 illustrates an alternate embodiment, where similar elements to the first embodiment are given the same element numbers and the discussion herein will not be repeated.

In this embodiment, a horizontal hinge 54 extends laterally across the hood 18, and the grille 20 is fixed to the hood 18. The side latches 36 (such as those shown in FIG. 2) may be employed to selectively release the grille/front hood combination 56, to allow front access to the front trunk.

Additionally, the main (rear) portion 58 of the hood 18 may be released and pivot to an open position to allow full front and top access to the front trunk.

Figure 5:
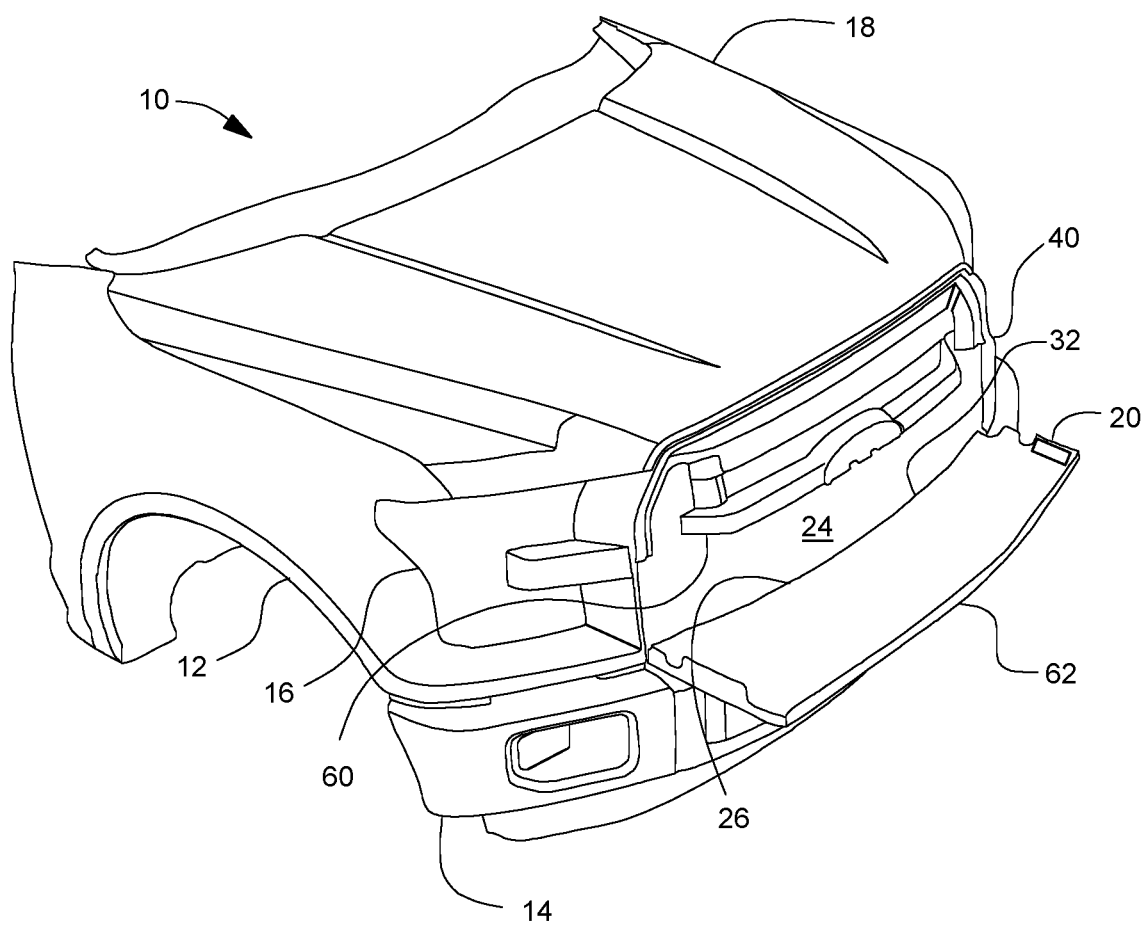
FIG. 5 is a schematic perspective view of a vehicle front end according to a fourth embodiment.

FIG. 5 illustrates an alternate embodiment, where similar elements to the first embodiment are given the same element numbers and the discussion herein will not be repeated.

In this embodiment, the grille 20 is a split grille having an upper portion 60 and a lower portion 62. The upper portion 60 is secured to the hood 18. The lower portion 62 mounts to the vehicle body structure 40 via the horizontal hinge 26 extending laterally across the bottom edge 32 of the lower portion 62 of the grille 20. The access to the front trunk 24 is similar to that of FIG. 1, but with the shorter grill portion pivoting downward, this allows one to stand closer to the front trunk 24 when inserting/removing items therefrom.

While certain embodiments of the present invention have been described in detail, those familiar with the art to which this invention relates will recognize various alternative designs and embodiments for practicing the invention as defined by the following claims.

The invention claimed is:

1. A vehicle comprising:
   front body structure including a grille opening adjacent to a front trunk;
   a hood pivotally mounted to the structure over the front trunk; and
   a grille mounted to the body structure via a horizontal hinge, the grille pivotable from a closed position in the grille opening to an open position extending forward from the body structure.

2. The vehicle of claim 1 wherein the grille includes a latch configured to selectively secure the grille to the body structure.

3. The vehicle of claim 2 wherein the latch releasably secures to a vertical side of the grille opening.

4. The vehicle of claim 1 wherein the horizontal hinge is secured to a bottom edge of the grille adjacent to a front bumper.

5. The vehicle of claim 4 wherein the grille, in the closed position, covers the entire grille opening.

6. The vehicle of claim 4 wherein the grille, includes an upper portion secured to the hood and a bottom portion pivotally secured to the hinge, with the bottom portion, in the closed position, covering a lower portion of the grille opening.

7. The vehicle of claim 1 wherein the horizontal hinge is secured to a top edge of the grille adjacent to the hood.

8. The vehicle of claim 7 wherein the grille, in the closed position, covers the entire grille opening.

9. A vehicle comprising:
   front body structure including a grille opening adjacent to a front trunk;
   a hood, pivotally mounted to the structure over the front trunk, and including a horizontal hinge extending laterally to create a front portion and a rear portion; and
   a grille, secured to the hood, pivotable with the front portion from a closed position in the grille opening to an open position out of the grille opening.

10. The vehicle of claim 9 wherein the grille includes a latch configured to selectively secure the grille to the body structure.

11. The vehicle of claim 10 wherein the latch releasably secures to a vertical side of the grille opening.

12. The vehicle of claim 9 wherein the grille, in the closed position, covers the entire grille opening.

13. A vehicle comprising:
   front body structure including a grille opening adjacent to a front trunk;
   a hood pivotally mounted to the structure over the front trunk; and
   a grille mounted to the hood via a horizontal hinge, the grille pivotable from a closed position in the grille opening to an open position extending forward from the body structure.

14. The vehicle of claim 13 wherein the grille includes a latch configured to selectively secure the grille to the body structure.

15. The vehicle of claim 13 wherein the grille, in the closed position, covers the entire grille opening.

* * * * *